US010007601B2

(12) United States Patent
Cheng (10) Patent No.: US 10,007,601 B2
(45) Date of Patent: Jun. 26, 2018

(54) DATA STORAGE DEVICE AND OPERATING METHOD FOR FLASH MEMORY

(71) Applicant: Silicon Motion, Inc., Jhubei, Hsinchu County (TW)

(72) Inventor: Chang-Kai Cheng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 256 days.

(21) Appl. No.: 13/862,782

(22) Filed: Apr. 15, 2013

(65) Prior Publication Data
US 2013/0326120 A1 Dec. 5, 2013

(30) Foreign Application Priority Data
May 31, 2012 (TW) .............................. 101119468 A (51) Int. Cl.
*G06F 12/02* (2006.01)
(52) U.S. Cl.
CPC .. *G06F 12/0246* (2013.01); *G06F 2212/7202* (2013.01)
(58) Field of Classification Search
CPC .................................................. G06F 12/0246
USPC .......................................................... 711/103
See application file for complete search history.

(56) References Cited

U.S. PATENT DOCUMENTS

| | | | |
|---|---|---|---|
| 8,606,987 B2 | 12/2013 | Yang et al. | |
| 2007/0030734 A1* | 2/2007 | Sinclair | G06F 3/0605 365/185.11 |
| 2007/0106842 A1 | 5/2007 | Conley et al. | |
| 2007/0186032 A1* | 8/2007 | Sinclair | G06F 3/0605 711/103 |
| 2008/0183949 A1* | 7/2008 | Ly et al. | 711/103 |
| 2010/0257308 A1* | 10/2010 | Hsu | G06F 12/0246 711/103 |
| 2011/0197017 A1* | 8/2011 | Yu et al. | 711/103 |
| 2011/0264843 A1* | 10/2011 | Haines | G06F 12/0246 711/103 |

(Continued)

FOREIGN PATENT DOCUMENTS

| | | |
|---|---|---|
| CN | 1567476 | 1/2005 |
| CN | 101464834 | 6/2009 |

(Continued)

OTHER PUBLICATIONS

English language machine translation of TW 200619934 (published Jun. 16, 2006).

(Continued)

*Primary Examiner* — Gautam Sain
(74) *Attorney, Agent, or Firm* — McClure, Qualey & Rodack, LLP (57) ABSTRACT

A data storage device and operating method for a FLASH memory are disclosed. The data storage device includes a FLASH memory and a controller. The FLASH memory includes a first block and a second block. The first and second blocks each includes a plurality of pages. The controller executes a firmware to determine whether a data segment from a host is a complete page segment. When the data segment is a complete page segment, the controller stores the data segment into the first block. When the data segment is an incomplete page segment, the controller stores the data into segment the second block.

24 Claims, 9 Drawing Sheets

(56) References Cited

U.S. PATENT DOCUMENTS

| | | | |
|---|---|---|---|
| 2012/0131266 A1 | 5/2012 | Cho et al. | |
| 2012/0151124 A1* | 6/2012 | Baek | G06F 12/0246 |
| | | | 711/103 |
| 2012/0239853 A1* | 9/2012 | Moshayedi | 711/103 |
| 2013/0166818 A1* | 6/2013 | Sela | G06F 12/0246 |
| | | | 711/103 |
| 2014/0195715 A1 | 7/2014 | Kim et al. | |

FOREIGN PATENT DOCUMENTS

| | | |
|---|---|---|
| TW | 200619934 | 6/2006 |
| TW | 200826104 | 6/2008 |
| TW | 200926183 | 6/2009 |

OTHER PUBLICATIONS

English language machine translation of TW 200826104 (published Jun. 16, 2008).
English language machine translation of TW 200926183 (published Jun. 16, 2009).

* cited by examiner

DATA STORAGE DEVICE AND OPERATING METHOD FOR FLASH MEMORY

CROSS REFERENCE TO RELATED APPLICATIONS

This Application claims priority of Taiwan Patent Application No. 101119468, filed on May 31, 2012, the entirety of which is incorporated by reference herein.

BACKGROUND OF THE INVENTION

Field of the Invention

The present invention relates to data storage devices and operating methods of a FLASH memory, and in particular, relates to data storage technology for a FLASH memory.

Description of the Related Art

FLASH memory is a non-volatile memory for data storage, which is electronically erased and programmed.

NAND FLASH is a type of FLASH memory, mostly implemented in a memory card, a USB FLASH device, a solid-state device (SSD) and so on.

A storage array of a NAND FLASH includes a plurality of blocks. An erase operation should be performed on an entire block. To release the space of a used block as a spare space to be allocated later, the whole space of the used block has to be erased. Valid data scattered throughout several blocks should be collected to other blocks (by performing a garbage collection operation). Only invalid data is left in the several blocks. The blocks containing only invalid data can be erased and then regarded as spare blocks.

The garbage collection operation, conventionally, consumes a considerable amount of computing resources. A method for efficiently operating the storage array of a FLASH memory is desirable in the field.

BRIEF SUMMARY OF THE INVENTION

A data storage device and a FLASH memory operating method are disclosed.

A data storage device in accordance with an exemplary embodiment of the invention comprises a FLASH memory and a controller. The FLASH memory comprises a first block and a second block. The first block and the second block each comprise a plurality of pages. The controller executes firmware to determine whether a data segment from a host is a complete page segment. When the data segment is a complete page segment, the controller writes the data segment into the first block. When the data segment is an incomplete page segment, the controller writes the data segment into the second block.

A FLASH memory operating method in accordance with an exemplary embodiment of the invention comprises the following steps: allocating a first block and a second block in a FLASH memory, wherein the first block and the second block each comprise a plurality of pages; determining whether a data segment issued from a host is a complete page segment; when the data segment is a complete page segment, writing the data segment into the first block; and, when the data segment is an incomplete page segment, writing the data segment into the second block.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
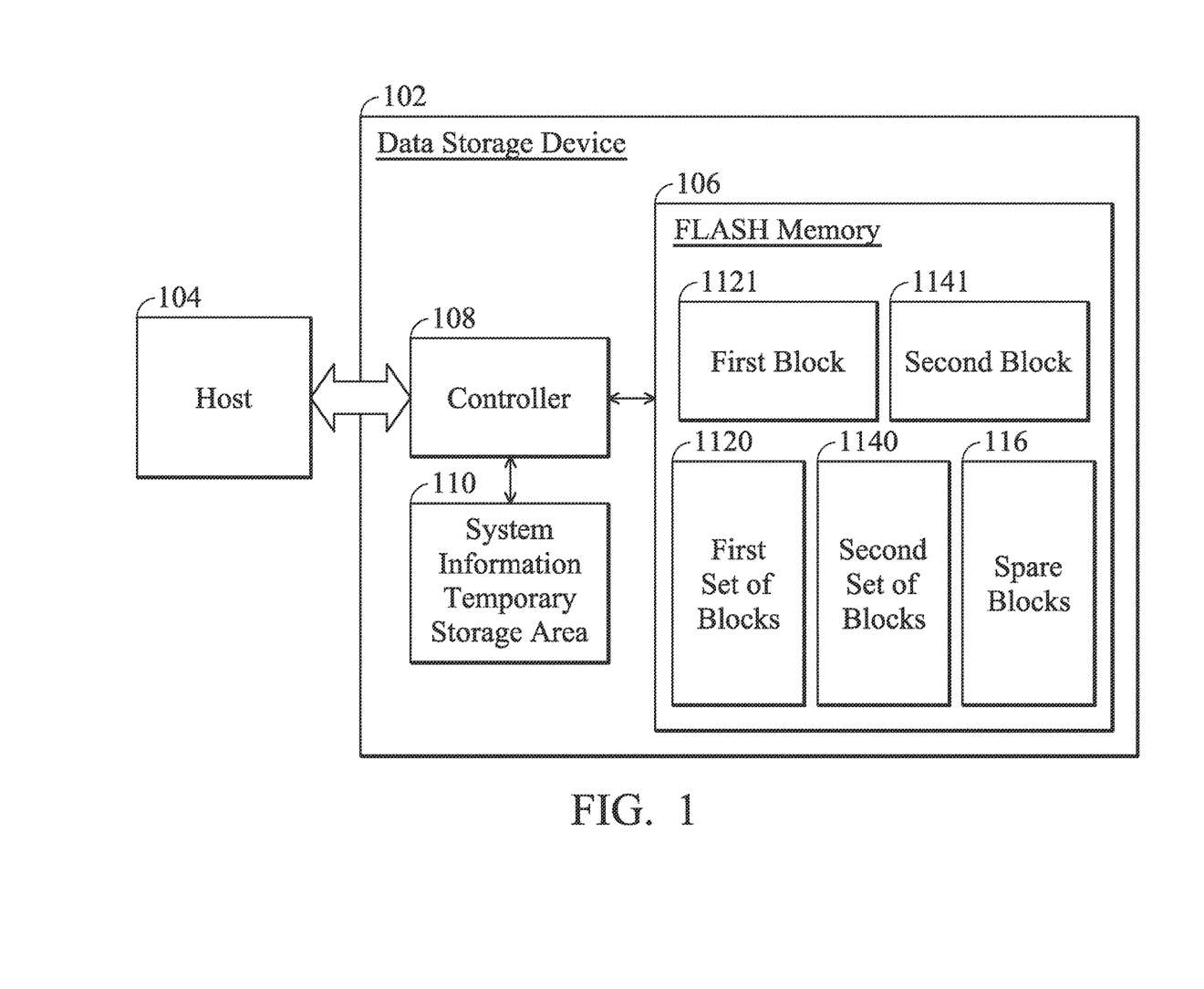
FIG. 1 is a block diagram depicting a data storage device 102 in accordance with an exemplary embodiment of the invention, wherein the data storage device 102 is controlled by a host 104.

FIG. 1 is a block diagram depicting a data storage device 102 in accordance with an exemplary embodiment of the invention, wherein the data storage device 102 is controlled by a host 104. The data storage device 102 comprises a FLASH memory 106, a controller 108 and a system information temporary storage area 110.

The FLASH memory 106 comprises a first block 1121, a second block 1141, a first set of blocks 1120, a second set of blocks 1140 and a set of spare blocks 116. The block set 1120 and 1140 each comprise blocks. Each block includes pages.

The controller 108 executes firmware (wherein the firmware code may be accessed from the ROM of the controller 108 or the FLASH memory 106) to determine the data attribution of the write data issued from the host 104 and received by the data storage device 102 and thereby writes the write data into a first block 1121 and/or a second block 1141 according to the data attribution. For example, the write data is analyzed segment by segment. The complete page segments are written into the first block 1121. The incomplete page segments are written into the second block 1141

Once the first block 1121 is fully filled, the first block 1121 is classified into the first block set 1120. Once the second block 1141 is fully filled, the second block 1141 is classified into the second block set 1140.

The system information temporary storage area 110 is stored with information about the write data. For example, information about the incomplete page data is recorded in the area 110 for analyzing a relationship between different data segments which have incomplete page sizes. In this manner, relevant incomplete page segments may be combined together as a complete page segment and then written into the second block 1141.

Figure 6:
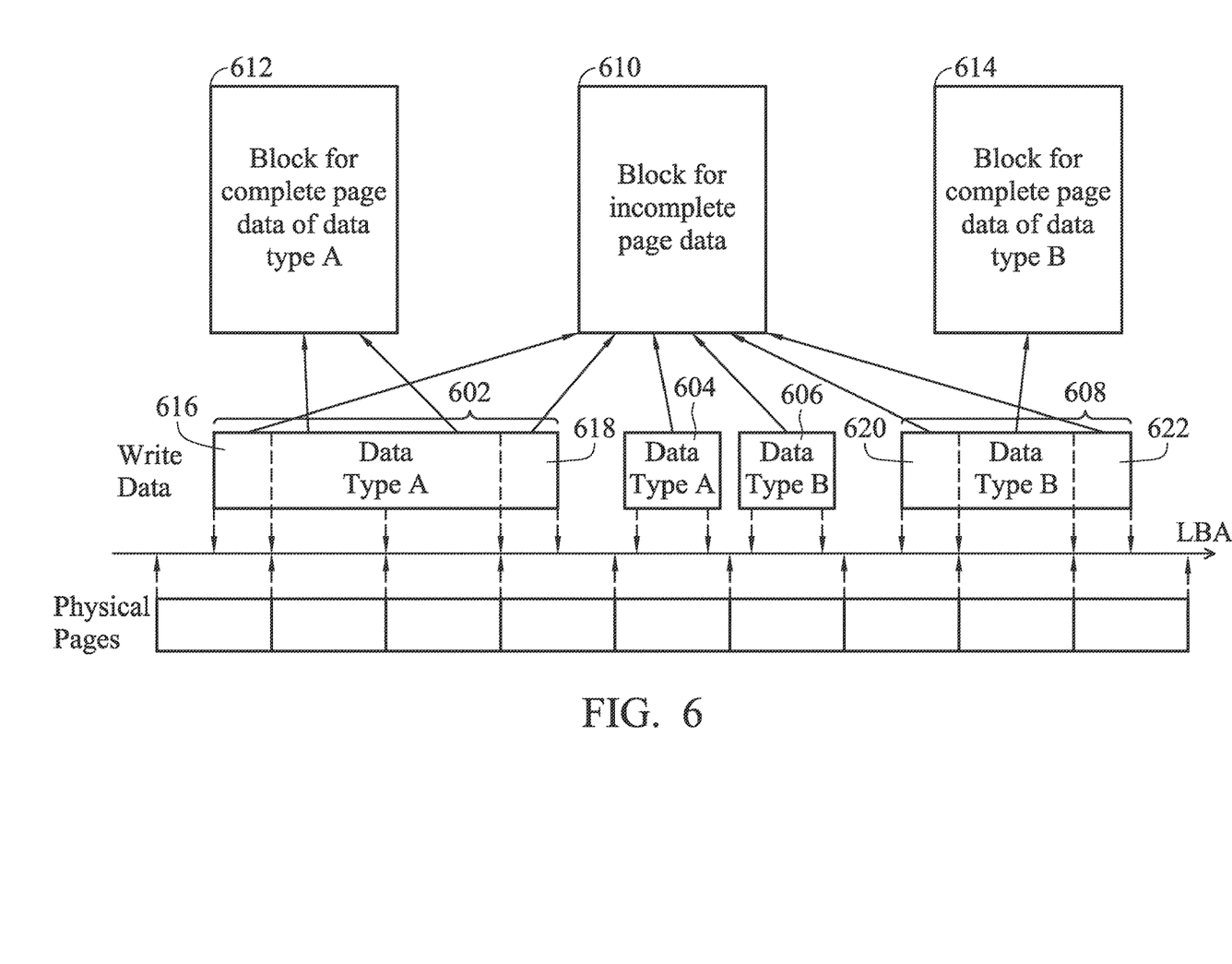
FIG. 6 depicts a data splitting technology, by which complete page data and incomplete page data are written into different blocks and complete page segments of different data types are written into the blocks of different block types and incomplete page segments are written into a same block without considering the data type.
Figure 7:
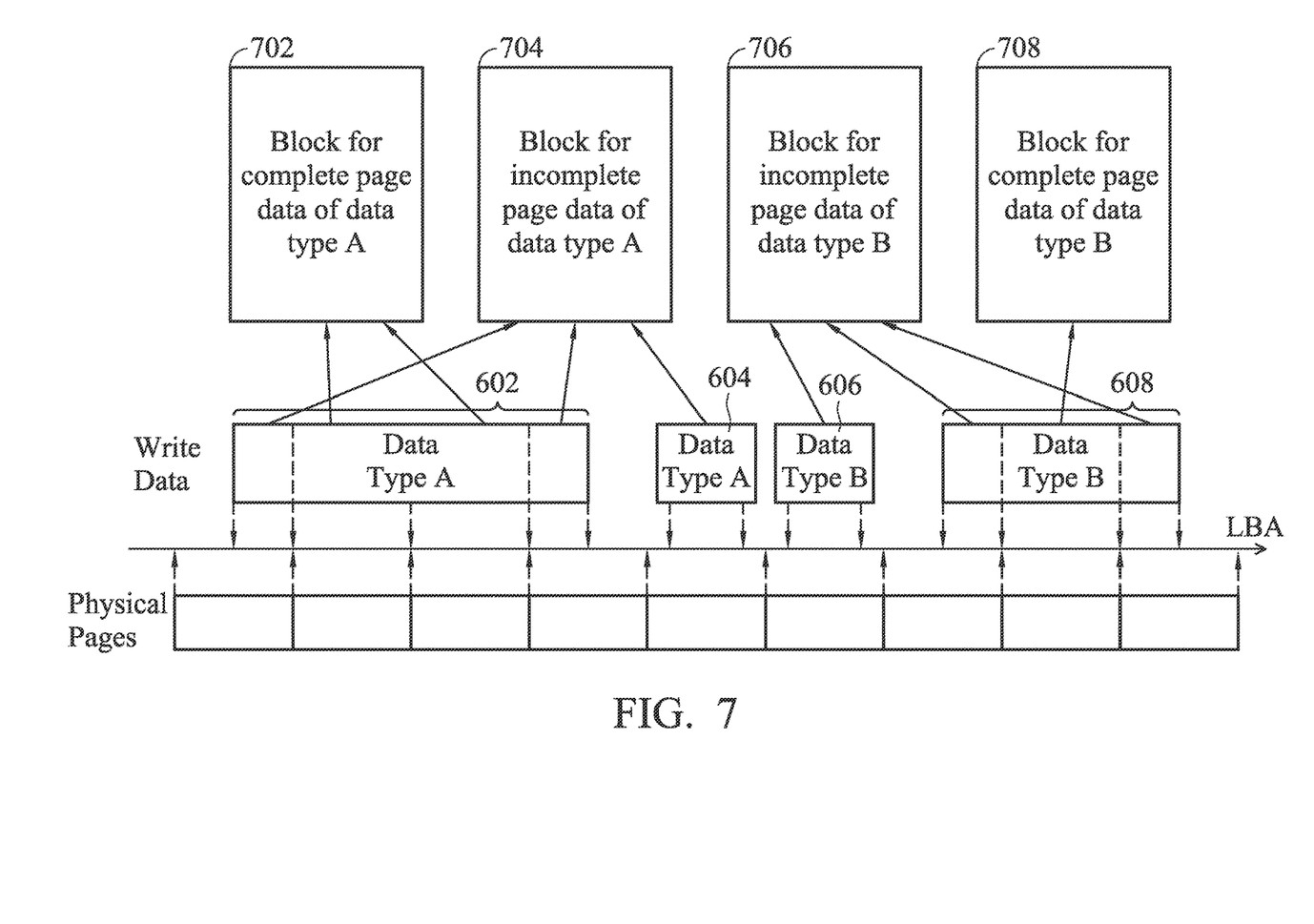
FIG. 7 depicts another data splitting technology, wherein, different from that shown in FIG. 6, incomplete page segments of different data types are written into the blocks of different block types.

In addition to determining whether a data segment is a complete page segment, the controller 108 may further take the information from the host (e.g., information obtained from data tag or context ID) into account to classify the data type of the data segment issued from the host 104. In an exemplary embodiment, complete page segments of different data types are written into the blocks of different block types, and, incomplete page segments are written into the blocks of a same block type without considering the data type (as shown in FIG. 6). In another exemplary embodiment, as shown in FIG. 7, different from that shown in FIG. 6, incomplete page segments of different data types are written into the blocks of different block types. The classification of data may depend on historical experiences (e.g., by analyzing the jump logic of the host addresses, or by analyzing the data length or logical address of the write data). A learning mechanism for historical experiences may be established by designing the firmware, executed by the controller 108.

Figure 2A:
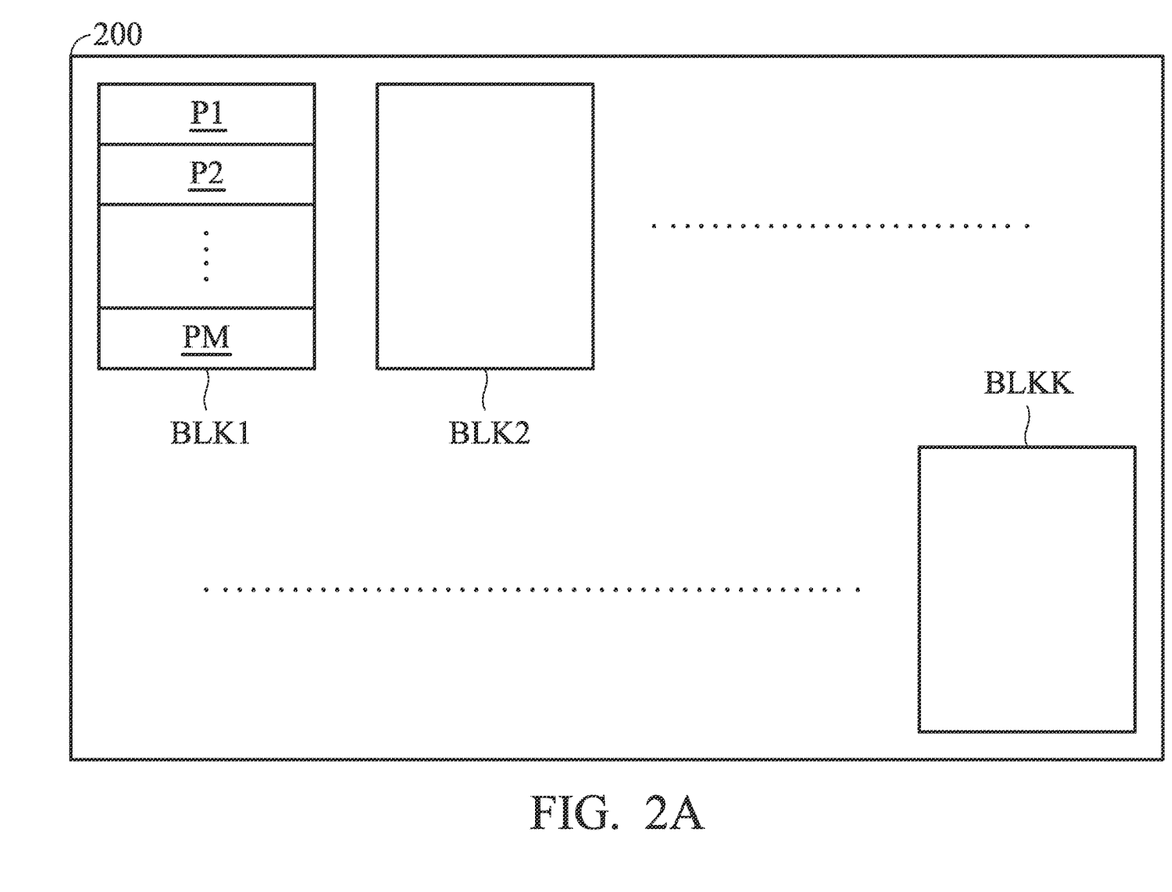
FIG. 2A depicts a structure of a FLASH memory.

FIG. 2A depicts a structure of a FLASH memory. The FLASH memory 200 comprises a plurality of blocks BLK1, BLK2 . . . BLKK. Each block comprises a plurality of pages; for example, block BLK1 comprises pages P1, P2 . . . PM.

Figure 2B:
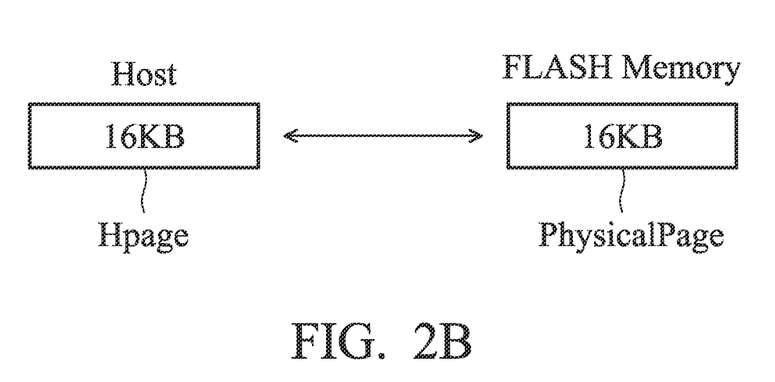
FIG. 2B shows how a host page Hpage (issued by the host terminal) maps to a physical page PhysicalPage (for example, the "page" depicted in FIG. 2A) of a FLASH memory.

FIG. 2B shows how a host page Hpage (issued by the host) maps to a physical page PhysicalPage (referring to the "page" defined in FIG. 2A) of a FLASH memory. The size of the host page Hpage may be equal to the size of the physical page PhysicalPage (e.g., both are 16 KB). Each host page Hpage requires a physical page PhysicalPage of the FLASH memory.

Based on the discussion of FIG. 2A and FIG. 2B, when the data segment issued from the host is a complete host page size (requiring a complete physical page for data storage), the data segment issued from the host is a complete page segment. When the data segment issued from the host is an incomplete host page size (requiring just an incomplete physical page for data storage), the data segment issued from the host is an incomplete page segment.

Figure 3:
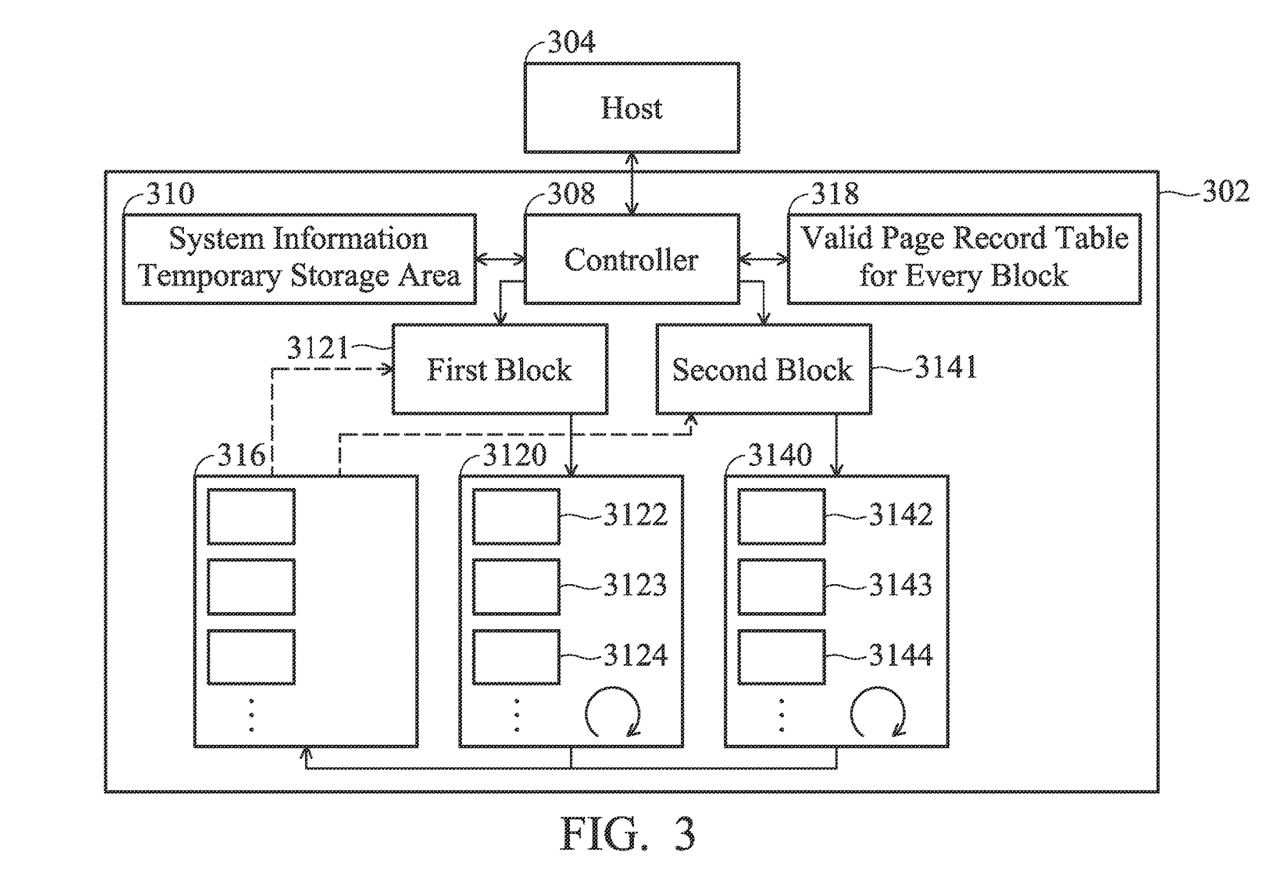
FIG. 3 depicts the operations of the disclosed data storage device, showing a data splitting technology.

FIG. 3 depicts operations of a data storage device in accordance with an exemplary embodiment of the invention, wherein the architecture for a data splitting technology is shown. In the data storage device 302, a first block 3121 and a second block 3122 are selected from a set of spare blocks 316 by the controller 308. The controller 308 performs data attribution analysis on the write data issued from the host 304. According to the data attributions of the different data segments of the write data, the controller 308 writes the data segments separately into the first block 3121 and/or the second block 3141. For example, when receiving a data segment issued from the host 304, the controller 308 determines whether the data segment is a complete page segment. If yes, the controller 308 writes the data segment into the second block 3141. If no, the controller 308 writes the data segment into the first block 3121. Further, the information about incomplete page data may be recorded in the system information temporary storage area 310.

Once the first block 3121 is fully filled, the first block 3121 is classified into the first set of blocks 3120. Once the second block 3141 is fully filled, the second block 3141 is classified into the second set of blocks 3140.

A valid page record table 318 is also established in the architecture shown in FIG. 3. When the amount of spare blocks is lower than a predetermined minimum amount, a garbage collection operation is performed on the first set of blocks 3120 and/or the second set of blocks 3140 to release spare blocks and thereby increase the system efficiency. When a garbage collection operation is performed on the first set of blocks 3120, only the blocks classified as the first block set 3120 (e.g. blocks 3122, 3123 and 3124) are eligible for valid data collection. When a garbage collection operation is performed on the second set of blocks 3140, only the blocks classified as the second block set 3140 (e.g. blocks 3142, 3143 and 3144) are eligible for valid data collection. A garbage collection operation results in several blocks containing only invalid data while the valid data have been collected to other blocks. The blocks containing zero valid data are released and classified into the spare block set 316.

In an exemplary embodiment, the valid page record table 318 stored in a non-volatile memory or a DRAM is operative to monitor the valid data distribution of each block. Further, processes for determining data attribution or performing valid data collection are executed by a controller of the data storage device according to a firmware.

Figure 4:
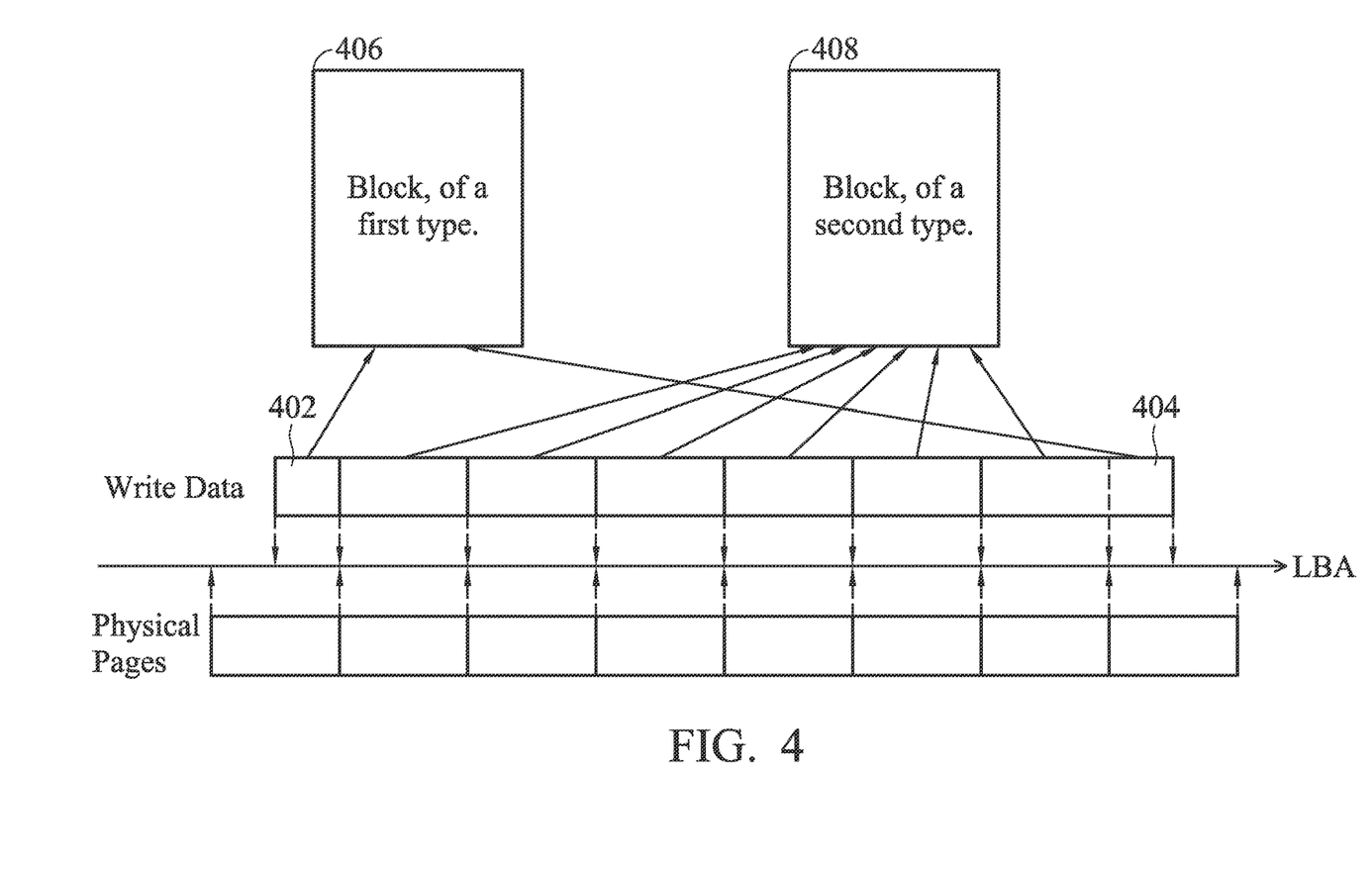
FIG. 4 shows how a series of data segments is written into a FLASH memory by a data splitting technology in accordance with an exemplary embodiment of the invention.

FIG. 4 depicts a data splitting technology in accordance with an exemplary embodiment of the invention. As shown, write data containing consecutive data segments is issued from the host, which corresponds to eight physical pages of a FLASH memory. Referring to the head and tail data segments 402 and 404, each is an incomplete page segment. Referring to the rest of the write data, each data segment is a complete page segment. According to the disclosed technique, the head and tail data segments 402 and 404 (incomplete page segments) between the consecutive data segments are written into the block 406 which is a first block type. The rest of the write data (complete page segments) are written into the block 408 which is a second block type. In this manner, invalid data densely occupies the block 406. The number of invalid data is effectively suppressed in the block 408. Storage efficiency is considerably improved.

Figure 5A:
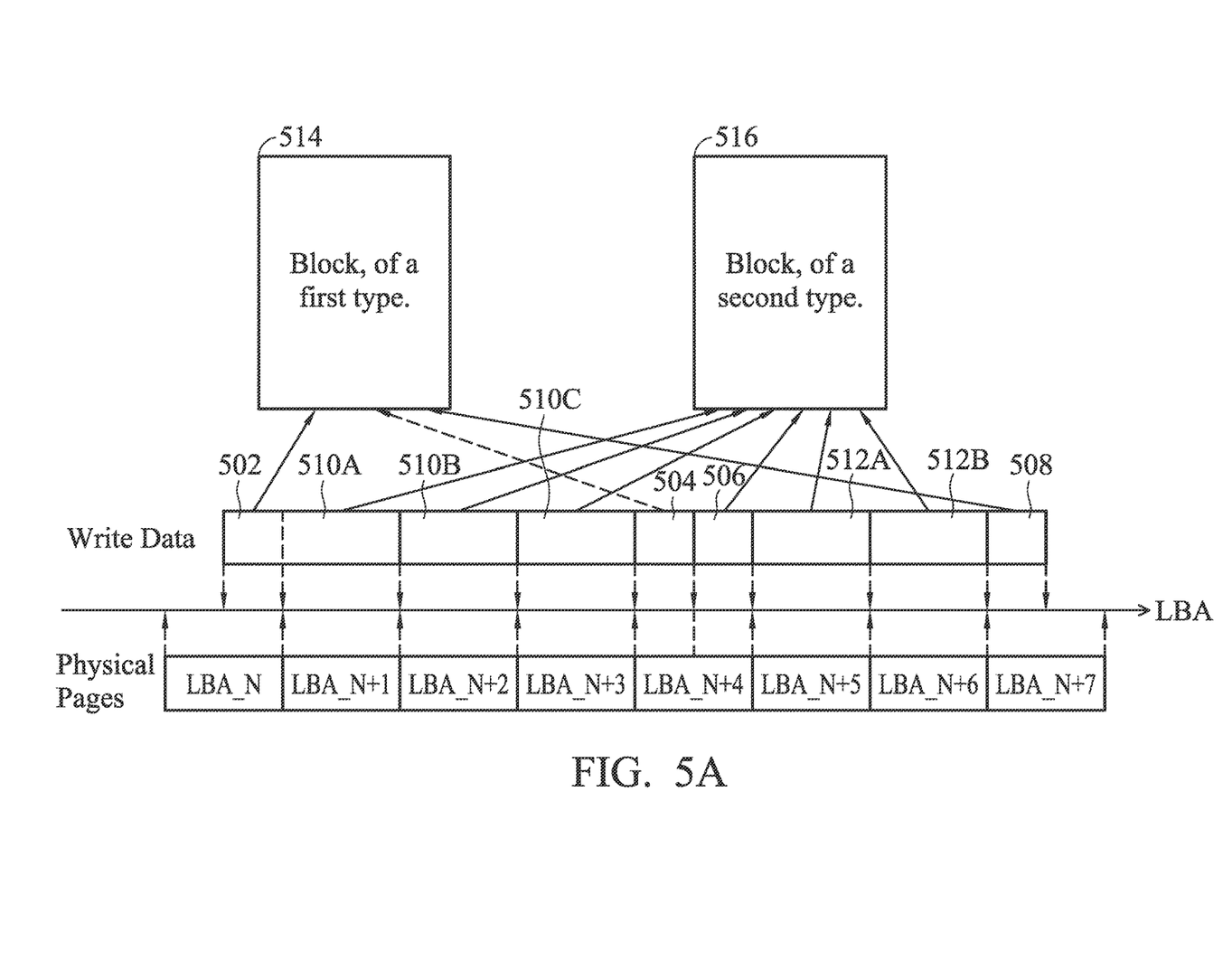
FIG. 5A shows how a series of data segments is written into a FLASH memory when an interrupt occurs.

FIG. 5A depicts a data splitting technology in accordance with another exemplary embodiment of the invention, wherein write data, including data segments 502, 510A-510C, 504, 506, 512A-512B and 508 at consecutive logical addresses, is issued from the host. The data segments 502, 504, 506 and 508 are incomplete page segments. The data segment 502 corresponds to the posterior part of page LBA_N. The data segment 504 corresponds to the front part of page LBA_N+4. The data segment 506 corresponds to the posterior part of page LBA_N+4. The data segment 508 corresponds to a front part of page LBA_N+7. The data segments 510A, 510B, 510C, 512A and 512B are complete page data. The data segment 510A corresponds to page LBA_N+1. The data segment 510B corresponds to page LBA_N+2. The data segment 510C corresponds to page LBA_N+3. The data segment 512A corresponds to page LBA_N+5. The data segment 512B corresponds to page LBA_N+6.

Note that when the data storage device 302 receives an incomplete page segment, information associated with the logical block address (LBA) of the incomplete page segment or an LBA tag is record in the system information temporary storage area 310. Based on the recorded LBA information or the LBA tag, the data storage device 102 determines whether an incomplete page segment issued later can be combined with a previously issued incomplete page segment. When the later incomplete page segment and the previously received incomplete page segment are at consecutive LBAs, the two segments of incomplete page data are combined together to form a complete page segment.

For example, when receiving the incomplete page segment 504, the data storage device 302 records the LBA tag of the front part of the page LBA_N+4 into the system information temporary storage area 310 and writes the incomplete page segment 504 into the block 514 which is a first block type. Later, when the incomplete page segment 506 corresponding to the rear part of page LBA_N+4 is received, the data storage device 302 checks the system information temporary storage area 310 for the LBA tag of the front part of the page LBA_N+4. When it is determined that the LBA tag of the front part of the page LBA_N+4 has been recorded in the area 310, the incomplete page segment 504 is read out from the block 514 and combined with the incomplete page segment 506 to form a complete page segment. The complete page segment formed by 504 and 506 is written into the block 516 which is a second block type. Note that the incomplete page segment 506 is not written into the block 514 but directly combined with the page segment 504 to be stored in the page segment 516. The space utilization is considerably improved.

Figure 5B:
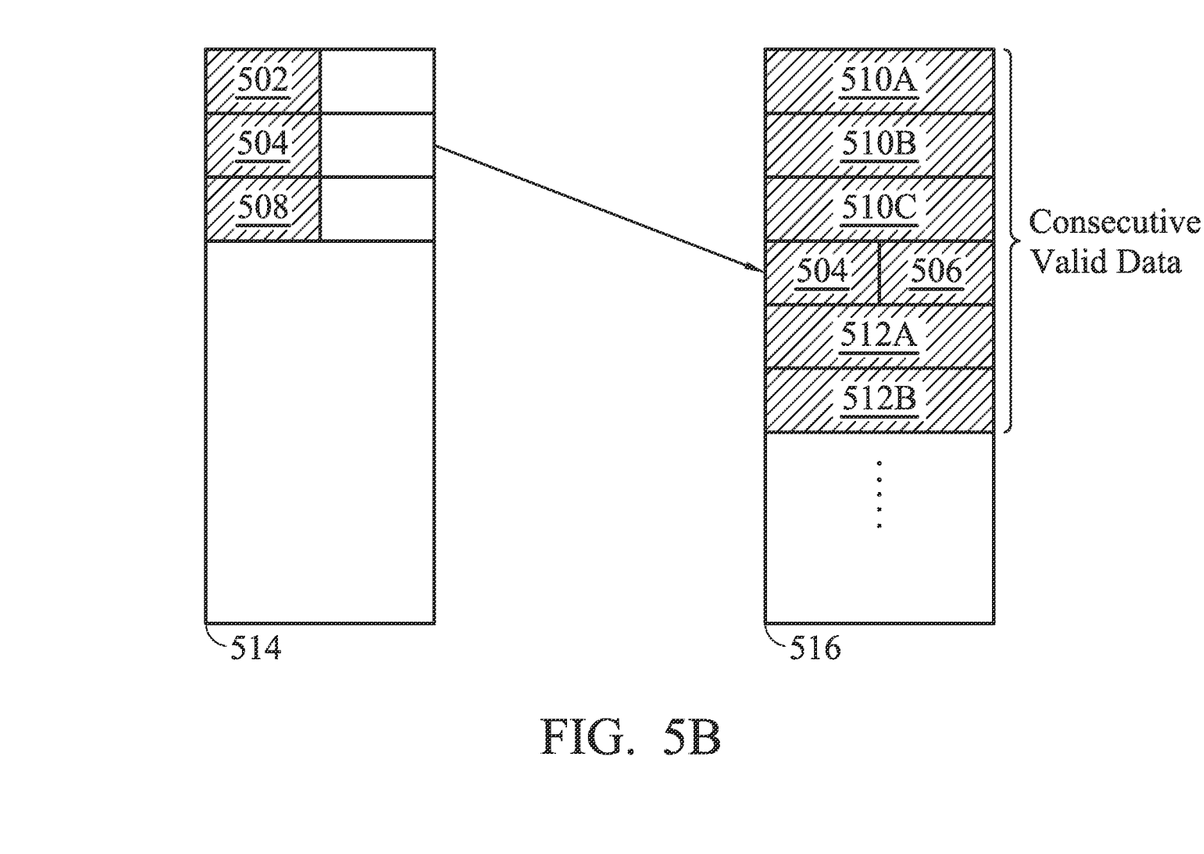
FIG. 5B is discussed with respect to FIG. 5A and shows the data distribution in the blocks 514 and 516.

FIG. 5B is discussed with respect to FIG. 5A and shows the data distribution in the blocks 514 and 516. The incomplete page segment 502 is written into the block 514 which is the first block type. The complete page segments 510A, 510B and 510C are written into the block 516 which is the second block type. The incomplete page segment 504 is written into the block 514 first and then is moved to the block 516 to be combined with the incomplete page segment 506 as a complete page segment (referring to the arrow). Thus, space utilization is considerably improved in comparison with separately storing the two incomplete page segments 504 and 506 into the block 514.

When transmission errors or power failure occurs or the host requests to write data segment by segment, data of one LBA may be received in segments (e.g. the two incomplete page segments 504 and 506). However, according to the disclosed technique, instead of being erroneously stored to the block allocated for incomplete page data, the segments of a complete page are collected and combined and written into the block allocated for complete page data. Thus, space utilization is improved and the operation efficiency of the FLASH memory is considerably improved.

In some exemplary embodiments, the host information, including the data tag or the context ID, is taken into account in the data splitting technology.

FIG. 6 depicts a data splitting technology in accordance with an exemplary embodiment of the invention, wherein the host information (e.g. the data tag or context ID) represents the data type of write data. As shown, the host issues a long data 602 of data type A, a short data 604 of data type A, a short data 606 of data type B and a long data 608 of data type B. Three blocks of different block types are required, including a block 610 for incomplete page data, a block 612 for complete page data of data type A, and a block 614 for complete page data of data type B. The head and tail data segments 616 and 618 of the long data 602 of data type A are written into the block 610 which is allocated exclusively for incomplete page data. The complete page segments within data 602 are written into the block 612 which is allocated exclusively for complete page data of data type A. The short data 604 of data type A is an incomplete page segment and is written into the block 610 which is allocated exclusively for incomplete page data. The short data 606 of data type B is an incomplete page segment and is written into the block 610 which is allocated exclusively for incomplete page data. The head and tail data segments 620 and 622 of the long data 608 of data type B are written into the block 610 which is allocated exclusively for incomplete page data. The complete page segments within data 608 are written into the block 614 which is allocated exclusively for complete page data of data type B. According to the exemplary embodiment, complete page segments of different data types are written into the blocks of different block types, and, incomplete page segments are written to the blocks of a same block type without considering the data type. Because complete page segments of different data types are stored in blocks of different block types, less invalid memory information is distributed in the FLASH memory. The operation efficiency of the FLASH memory is considerably improved.

FIG. 7 depicts another exemplary embodiment of the invention wherein incomplete page segments of different data types are written into the blocks of different block types. As shown, four blocks of different block types are required, including the block 702, for complete page data of data type A, the block 704, for incomplete page data of data type A, the block 706, for incomplete page data of data type B, and the block 708, for complete page data of data type B. By the data splitting technology of FIG. 7, the operation efficiency of the FLASH memory is more effectively improved in comparison with that of FIG. 6.

In an exemplary embodiment, the controller 308 of FIG. 3 is designed to provide a learning mechanism for data classification based on historical experiences. For example, the jump logic of logical addresses of write data may be summarized from historical experiences for data classification. In another exemplary embodiment, the data length or logical address of write data may be collected and analyzed for data classification. The learning mechanism may be performed by a controller of a data storage device in accordance with a firmware.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a FLASH memory, comprising a first block and a second block, wherein each of the first block and the second block comprises a plurality of pages;
a controller, electrically communicating with the FLASH memory and having circuitry configured to:
  determine whether a first data segment issued from a host is a complete page segment, wherein the controller writes the first data segment into the first block if the first data segment is a complete page segment, and, the controller writes the first data segment into the second block if the first data segment is an incomplete page segment;
  classify the first block into a first set of blocks, which stores only complete page segments, responsive to the first block being filled;
  classify the second block into a second set of blocks, which stores only incomplete page segments, responsive to the second block being filled;
  during a first garbage collection operation, collect valid data only from the first set of blocks to release space of blocks of invalid data from the first set of blocks; and during a second garbage collection operation, collect valid data only from the second set of blocks to release space of blocks of invalid data from the second set of blocks.

2. The data storage device as claimed in claim 1, further providing a system information temporary storage area for storing information about write data issued from the host.

3. The data storage device as claimed in claim 2, wherein the information about write data contains information associated with incomplete page segments.

4. The data storage device as claimed in claim 3, wherein the information associated with incomplete page segments contains logical address information about the incomplete page segments.

5. The data storage device as claimed in claim 2, wherein when the data storage device receives a second data segment, the controller determines whether the second data segment is a complete page segment.

6. The data storage device as claimed in claim 5, wherein when the second data segment is an incomplete page segment, the controller checks the information stored in the system information temporary storage area to determine whether the first data segment and the second data segment form a complete page segment.

7. The data storage device as claimed in claim 6, wherein when the first data segment and the second data segment form a complete page segment, the controller combines the first data segment with the second data segment as a complete page segment and writes the complete page segment combined by the first and second data segments into the first block.

8. The data storage device as claimed in claim 6, wherein the controller determines whether logical addresses of the first and second data segments are consecutive and determines that the first data segment and the second data segment form a complete page segment when the first and second data segments are consecutive.

9. The data storage device as claimed in claim 1, wherein the controller executing the firmware further determines, in accordance with host information, a data type of a write data issued from the host, by which complete page segments of different data types are written into the blocks of different block types and incomplete page segments are written into the blocks of a same block type without considering the data type.

10. The data storage device as claimed in claim 9, wherein the host information is obtained from data tag or context ID.

11. The data storage device as claimed in claim 1, wherein the controller executing the firmware further determines, in accordance with host information, a data type of a write data issued from the host, by which data segments of different data types are written into the blocks of different block types.

12. The data storage device as claimed in claim 11, wherein the host information is obtained from data tag or context ID.

13. A FLASH memory operating method, comprising:
allocating a first block and a second block in a FLASH memory, wherein the first block and the second block each comprises a plurality of pages;
determining whether a first data segment issued from a host is a complete page segment, and, writing the first data segment into the first block if the first data segment is a complete page segment, and, writing the first data segment into the second block if the first data segment is an incomplete page segment;
classifying the first block into a first set of blocks, which stores only complete page segments, responsive to the first block being filled;
classifying the second block into a second set of blocks, which stores only incomplete page segments, responsive to the second block being filled;
during a first garbage collection operation, collecting valid data only from the first set of blocks to release space of blocks of invalid data from the first set of blocks; and
during a second garbage collection operation, collecting valid data only from the second set of blocks to release space of blocks of invalid data from the second set of blocks.

14. The FLASH memory operating method as claimed in claim 13, further comprising:
providing a system information temporary storage area to store information about write data issued from the host.

15. The FLASH memory operating method as claimed in claim 14, wherein the information about write data contains information associated with incomplete page segments.

16. The FLASH memory operating method as claimed in claim 15, wherein the information associated with incomplete page segments contains logical address information about the incomplete page segments.

17. The FLASH memory operating method as claimed in claim 14, further determining whether a second data segment issued from the host is a complete page segment when receiving the second data segment.

18. The FLASH memory operating method as claimed in claim 17, further comprising:
checking the information stored in the system information temporary storage area after determining that the second data segment is an incomplete page segment, to determine whether the first data segment and the second data segment form a complete page segment.

19. The FLASH memory operating method as claimed in claim 18, further comprising:
when determining that the first data segment and the second data segment form a complete page segment, combining the first data segment with the second data segment to form a complete page segment and writing the complete page segment combined from the first and second data segments into the first block.

20. The FLASH memory operating method as claimed in claim 18, wherein a step of determining whether the first data segment and the second data segment form a complete page segment comprises:
determining whether logical addresses of the first and second data segments are consecutive.

21. The FLASH memory operating method as claimed in claim 13, further comprising:
determining data types of data segments issued from the host in accordance with host information;
writing complete page segments of different data types into the blocks of different block types; and
writing incomplete page segments into the blocks of a same block type no matter what data types the incomplete page segments are.

22. The FLASH memory operating method as claimed in claim 21, wherein the host information is obtained from data tag or context ID.

23. The FLASH memory operating method as claimed in claim 13, further comprising:
determining data types of data segments issued from the host; and writing the data segments of different data types into the blocks of different block types.

24. The FLASH memory operating method as claimed in claim 23, wherein the host information is obtained from data tag or context ID.

* * * * *